July 27, 1965   F. H. VAN WINSEN ETAL   3,197,233
SPRING STABILIZER ARRANGEMENT
Filed March 26, 1962                 2 Sheets-Sheet 1

INVENTORS.
FRIEDRICH H. VAN WINSEN
KLAUS BAUER
BY
Dieke and Craig
ATTORNEYS.

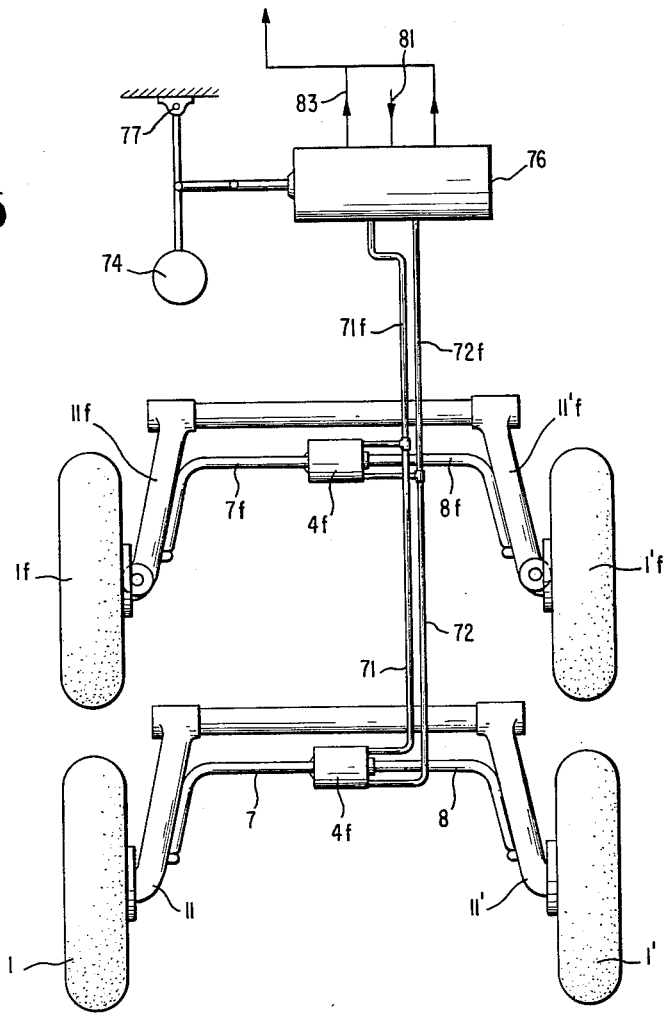

United States Patent Office 3,197,233
Patented July 27, 1965

3,197,233
SPRING STABILIZER ARRANGEMENT
Friedrich H. Van Winsen, Kirchheim-Teck, and Klaus Bauer, Stuttgart-Unterturkheim, Germany, assignors to Daimler-Benz Aktiengesellschaft, Stuttgart-Unterturkheim, Germany
Filed Mar. 26, 1962, Ser. No. 182,327
Claims priority, application Germany, Apr. 7, 1962
D 35,806
12 Claims. (Cl. 280—112)

The present invention relates to a spring stabilizing arrangement for motor vehicles utilizing torsion rod stabilizers of the type disclosed in the copending application Serial No. 59,961, by Friedrich Van Winsen et al., filed on March 10, 1960, now abandoned, entitled "Vehicle Body Stabilizing System," assigned to the assignee of the present application, and more particularly relates to an improvement in the adjusting motor for torsion rod stabilizers used in vehicle body stabilizing systems of the type described in the aforementioned copending application.

As disclosed in the aforementioned copending application the contents of which are incorporated herein by reference insofar as necessary, it is known in the prior art to support the vehicle body of a motor vehicle against a mechanism which prevents lateral tilting thereof while driving through a curve by applying a counterforce on the vehicle body, acting through the existing spring system and corresponding to the prevailing centrifugal force. However, these prior art installations and systems entail numerous disadvantages, as also disclosed in the aforementioned application, especially in connection with vehicles provided with pneumatic spring systems.

To obviate these disadvantages, the aforementioned application disclosed an arrangement utilizing a stabilizer torsion rod which consists of two parts operatively connected with each other by a hydraulically operated adjusting motor arranged between the two parts whereby the adjusting motor effects adjustment between the two torsion rod parts in opposition to the effect of the centrifugal force.

To assure continued operability of the motor vehicle in case of failure of the hydraulic system for the adjusting motor by effectively converting the two-partite torsion rod and adjusting motor arrangement into a system effectively corresponding to a normal unitary spring stabilizer system, the present invention provides an improved adjusting motor, and essentially consists in a mechanical locking arrangement for the adjusting motor which is dependent upon the working pressure of the pressure medium in the adjusting motor.

It is the principal aim and purpose of the present invention to effectively maintain a temporary stabilization of the motor vehicle even if the supply of pressure medium to the adjusting motor is discontinued, for instance, due to a failure or breakdown in the pressure-medium supply pump, or also if the working pressure in the adjusting motor drops below a predetermined value for any other reasons.

Accordingly, it is an object of the present invention to provide an anti-tilt spring system utilizing a two-partite torsion rod of the type mentioned hereinabove in which the torsion rod can operate in the normal manner in case of failure of the anti-tilt control system.

Another object of the present invention resides in the provision of an anti-tilt torsion rod spring system which assures continued operability to enable driving of the vehicle even in case of failure of the anti-tilt feature thereof.

Still a further object of the present invention resides in the provision of an adjusting motor operatively connecting a two-partite anti-tilt torsion rod spring system which offers greater safety and reliability in operation and establishes an effective connection of the two torsion rod parts in case of failure of the adjusting medium controlling the adjusting motor.

Still another object of the present invention resides in the provision of an adjusting motor of the type described hereinabove which fulfills the aims and purposes outlined hereinabove by simple means that may be readily incorporated into the known type of adjusting motor without increasing the size thereof.

These and further objects, features and advantages of the present invention will become more obvious from the following description when taken in connection with the accompanying drawing which shows, for purposes of illustration only, one embodiment in accordance with the present invention, and wherein FIGURE 1 is a schematic plan view of the rear wheel pair of a motor vehicle provided with a pneumatic spring system and with a torsion-rod stabilizer arrangement in accordance with the present invention;

FIGURE 5 is a view in perspective showing the installation of the spring stabilizer arrangement in coordination with two pairs of vehicle wheels.

Figure 1:
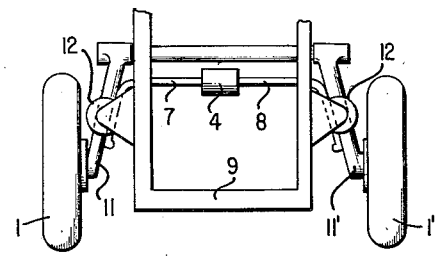

Referring now to the drawing wherein like reference numerals are used throughout the various views to designate corresponding parts, and more particularly to FIGURE 1, reference numerals 1 and 1' designate therein oppositely disposed vehicle wheels which are guided by guide members 11 and 11' swinging in the longitudinal vehicle direction. These guide members 11 and 11' are spring supported in any conventional manner, for example, by pneumatic springs 12. Furthermore, the angularly bent ends of two torsion spring rods 7, 8, the inner ends of which are disposed in a straight line extending transversely to the longitudinal vehicle direction, engage the guide members 11 and 11'. The junction point of the two torsion spring rods 7 and 8 is bridged by an adjusting motor 4.

Figure 2:
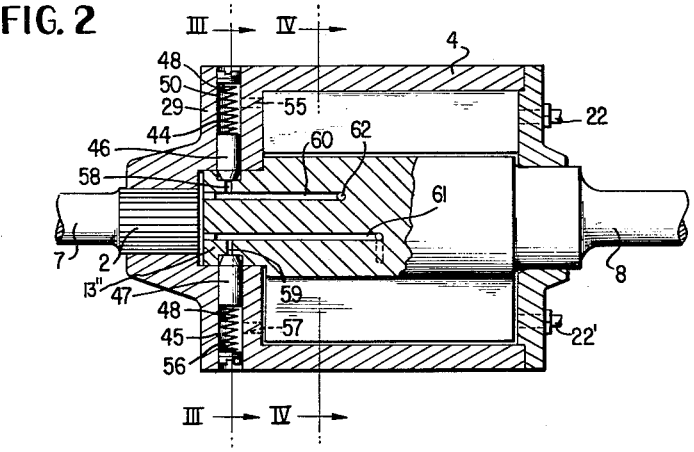
FIGURE 2 is an axial cross sectional view through the adjusting motor in accordance with the present invention for the torsion rod stabilizer system according to FIGURE 1, taken along line II—II of FIGURE 4 and subtending an angle of 90°.
Figure 4:
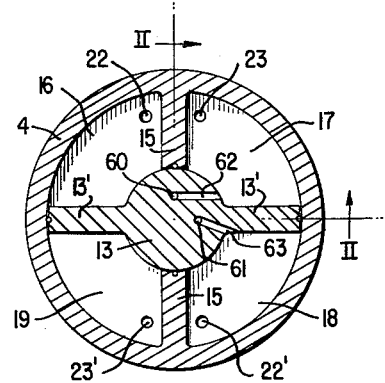
FIGURE 4 is a cross-sectional view through the pressure-medium cylinder of the adjusting motor, taken along line IV—IV of FIGURE 2.

As is shown particularly in FIGURE 2, the adjusting motor consists of a cylindrical housing 4, which is non-rotatably connected, for example, by a splined connection 2 with the torsion spring rod 7, and which, as shown in FIGURE 4, is subdivided into 4 chambers 16, 17, 18 and 19, by two diametrally opposite ribs 15 projecting into the cylinder space of the housing and by two symmetrical vanes 13' of a vane-type swinging piston 13, rotatably supported within the housing 4. One of the conduits 22, 22' and 23, 23' which serve for the supply and discharge of the pressure medium, respectively, terminate in each of the chambers 16, 17, 18 and 19, the conduit 22 being connected with conduit 22' and the conduit 23 with conduit 23' outside of the adjusting motor 4, in the illustrated embodiment. The vane piston 13, 13' is secured in any suitable manner to the end of the torsion spring rod 8 which is opposite the torsion rod spring 7.

Figure 3:
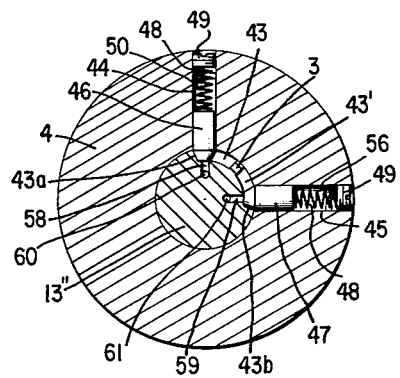
FIGURE 3 is a cross-sectional view through the locking arrangement of the adjusting motor, taken along line III—III of FIGURE 2.

Within the area of the connecting boss 2 for the torsion spring rod 7, the housing 4 is provided with a reinforced end wall 29. The reinforced end wall 29 serves as bearing for the vane piston 13 which is stepped or offset thereat into a reduced bearing head portion 13". The bearing head portion 13" is provided with two channels, slots or grooves 43 and 43' (FIGURE 3) positioned along a common peripheral line which are separated from one another merely by a web portion 3 and which extend in their total length over an angle of about 90° of the circumference of the bearing head portion 13". Two radial bores 44 and 45, which are also provided within the housing end wall 29 under an angle of 90°, are directed toward these channels or groove 43 and 43'. One locking pin 46, 47 each projects from the inner bore ends into a respective one of the slots or channels 43 and 43' of the vane piston 13 in such a manner that in the center position of the adjusting motor, as shown in FIGURES 3 and 4, the slightly chamfered ends of the locking pins 46 and 47 will come into abutment against the respectively nearest slot or channel end 43a and 43b (FIGURE 3). In this manner, the vane piston 13 is locked against rotation in either direction of rotation. The locking pins 46 and 47 are displaceably supported within bores 44 and 45 and are subjected to the action of pressure springs 48, the tension of which may be adjusted by setscrews 49 provided at the outer ends of the bores 44 and 45. The springs normally seek to displace the locking pins 46 and 47 into the circumferential slot or channel sections 43 and 43'. The spring space 50 disposed to the rear of locking pin 46 is in communication with chamber 16 of the adjusting motor 4 through a bore 55 (FIGURE 2), and the spring space 56 disposed to the rear of locking pin 47 is in communication with chamber 19 of the adjusting motor 4 through a bore 57. Two radial bores 58 and 59 disposed directly in front of the locking pins 46 and 47 terminates in the base of the circumferential channels or slots 43 and 43' (FIGS. 2 and 3). These radial bores 58 and 59, in turn, communicate with axial bores 60 and 61 of the vane piston 13 from which radial bores 62 and 63 branch off to the chambers 17 and 18 of the adjusting motor.

*Operation*

FIGURE 5 illustrates the installation of applicant's spring stabilizer in coordination with the pair of wheels 1, 1' of FIGURE 2 and a further pair 1f, 1'f. As shown in FIGURE 5, a governor 74 controls the operation of a slide valve in cylinder 76, the governor being suspended at a suitable point on an axis 77 which is parallel to the longitudinal axis of the vehicle. Thus, the governor will swing out about its axis 77 when the vehicle performs a movement about its longitudinal axis. As further shown in FIGURE 5, the suspension means for the wheels 1f, 1'f includes counterparts of the elements shown in FIGURE 1 and in the lower part of FIGURE 5. These counterpart elements are designated with the corresponding reference numerals of the aforesaid elements but with the addition of the letter f to each numeral. Further diagrammatically shown in FIGURE 5 is a pressure medium supply line 81 with return flow lines 82, 83. As further shown, fluid lines 71, 71f and 72, 72f are disposed in pairs between the cylinder 76 and the respective adjusting motors 4 and 4f.

The operation of the adjusting motor in accordance with the present invention is a follows:

When pressure medium is supplied to chambers 17 and 19 through conduits 23 and 23', while conduits 22 and 22' leading to chambers 16 and 18 are opened up for the discharge of pressure medium, then the vane piston 13, 13', 13" seeks to rotate clockwise but will still be prevented from doing so by the locking pin 46 (FIGURE 2) abutting against shoulder 43a. A rotation of the vane piston 13 becomes possible only when the pressure occurring in chamber 17 becomes effective on the underside of the locking pin 46, lifts the same and therewith releases the locking engagement at shoulder 43a.

When the adjusting motor is reversed in such a manner that the pressure medium is supplied to chambers 16 and 18 through conduits or supply lines 22 and 22', while conduits 23 and 23' terminating in chambers 17 and 19 are opened up for the discharge of the pressure medium, then the vane piston 13, 13' seeks to rotate counter-clockwise but is prevented from doing so by the locking pin 47 abutting against the shoulder 43b until the pressure in chamber 18 becomes effective through conduits 63 and 61 and the locking engagement at shoulder 43b is released by the displacement of pin 47 into bore 45.

The control of the pressure medium takes place by any desired conventional installation known per se, for example, in dependence upon the centrifugal effect occurring in the vehicle, FIGURE 5 showing generally such an installation. The control, however, may also be operatively connected with the steering system of the vehicle. In the place of the wheel guide members swinging in the longitudinal vehicle direction, it is also possible to provide guide members extending transversely to the vehicle longitudinal axis, for instance, for the front wheels of a motor vehicle. Also, the pneumatic springs 12 may be replaced by any other appropriate springs.

If the pressure medium in the adjusting motor suffers a considerable pressure decrease, for instance, due to a defectiveness in the pressure medium supply pump, or due to leakage along the pressure medium lines, with the effect that a pressure sufficient for the stabilization effect can no longer be produced in the adjusting motor, then the adjusting motor 4 will be locked in both directions of rotation in the manner shown in FIGURE 3. No additional regulating force will then be produced for the angular displacement of the two torsion rod spring ends 7 and 8, but the latter, instead, will merely remain rigidly connected with each other. The effect is then the same as with a conventional continuous or uninterrupted torsion spring stabilizer, and the vehicle will retain its driving capability, even though to a limited extent, despite the failure of the hydraulic adjusting system.

While we have shown and described one embodiment in accordance with the present invention, it is understood that the same is not limited thereto, but is susceptible of many changes and modifications as known to a person skilled in the art, and we therefore do not wish to be limited to the details shown and described herein, but intend to cover all such changes and modifications as are encompassed by the scope of the appended claims.

We claim:

1. An anti-tilt system for stabilizing the vehicle body of a motor vehicle while driving through curves, comprising wheel suspension means for oppositely disposed wheels thereof, stabilizer torsion rod means operatively connecting with each other oppositely disposed wheel suspension means, said stabilizer torsion rod means including two torsion rod portions and means operatively connecting said two torsion rod portions for adjustment thereof with respect to each other in opposition to the effect of the centrifugal force acting on the vehicle including pressure-medium actuated adjusting motor means effectively connecting said two torsion rod portions with each other, said motor means comprising rotatable rib means connected to one of said torsion rod portions and rotatable vane means connected to the other of said two torsion rod portions, said rotatable rib means and said rotatable vane means being provided with releasable locking means therebetween responsive to pressure of the pressure-medium for the adjusting motor means.

2. An anti-tilt system according to claim 1, wherein the pressure medium is a hydraulic medium.

3. An anti-tilt system according to claim 1, wherein the pressure medium is a pneumatic medium.

4. An anti-tilt system for stabilizing the vehicle body of a motor vehicle having oppositely disposed front and rear wheels while driving through curves, comprising wheel suspension means for oppositely disposed wheels thereof, stabilizer torsion rod means operatively connecting with each other oppositely disposed wheel suspension means, said stabilizer torsion rod means including two torsion rod portions with the inwardly disposed ends thereof being arranged substantially coaxially opposite each other, and means including pressure-medium actuated adjusting motor means between said two torsion rod portions and operatively connecting said two torsion rod portions for adjustment thereof with respect to each other in opposition to the effect of the centrifugal force acting on the vehicle, said adjusting motor means including cylinder means operatively connected with one of said inwardly disposed torsion rod ends, said cylinder means comprising rotatable radially inwardly extending rib means, piston means within said cylinder means comprising rotatable vane means cooperating with said rib means, said piston means being operatively connected with the other of said inwardly disposed torsion rod ends, said rotatable rib means and said rotatable vane means being provided with releasable locking means therebetween responsive to pressure of the pressure-medium for the adjusting motor means.

5. In a motor vehicle provided with an anti-tilt, two-partite torsion rod stabilizer spring system operatively connecting oppositely disposed wheel suspension means of the vehicle, the improvement essentially consisting of an adjusting motor actuated by a pressure medium and operatively connecting in an adjustable manner the two parts of the torsion rod to obtain an anti-tilt effect by such adjustment comprising rotatable housing means operatively connected with one of the two torsion rod portions for rotation in unison therewith, vane-type piston means within said housing means forming effectively adjusting chamber means and operatively connected for rotation in unison with the other of the torsion rod portions, slots provided in said piston means locking pin means within said housing means and subjected, on one hand, to the force of spring means and, on the other, to the working pressure of said pressure medium prevailing within the adjusting chamber means effectively formed between said vane-type piston means and said housing means, said locking pin means engaging in a locking manner into said slots provided in said piston means and being displaced into the unlocking position thereof by said working pressure in opposition to said spring force.

6. In a motor vehicle provided with an anti-tilt, two-partite torsion rod stabilizer spring system operatively connecting oppositely disposed wheel suspension means of the vehicle, the improvement essentially consisting of an adjusting motor actuated by a pressure medium and operatively connecting in an adjustable manner the two parts of the torsion rod to obtain an anti-tilt effect by such adjustment comprising housing means operatively connected with one of the two torsion rod portions for rotation in unison therewith, vane-type piston means within said housing means forming effectively adjusting chamber means and operatively connected for rotation in unison with the other of the torsion rod portions, locking pin means within said housing means and subjected, on the one hand, to the force of spring means and, on the other, to the working pressure of said pressure medium prevailing within the adjusting chamber means effectively formed between said vane-type piston means and said housing means, said locking pin means engaging in a locking manner into the slots provided in said piston means and being displaced into the unlocking position thereof by said working pressure in opposition to said spring force, said housing means including an end wall in which said pin means are movably arranged, first means within said piston means effectively providing a communication between the chamber means of said motor and said pin means operable to produce an unlocking effect on a respective pin means by the working pressure of said pressure medium, and second means in said end wall to effectively provide a communication between said chamber means and respective spring spaces accommodating said spring means operable to produce a locking pressure on the corresponding pin means.

7. In a motor vehicle provided with an anti-tilt, two-partite torsion rod stabilizer spring system operatively connecting oppositely disposed wheel suspension means of the vehicle, the improvement essentially consisting of an adjusting motor actuated by a pressure medium and operatively connecting in an adjustable manner the two parts of the torsion rod to obtain an anti-tilt effect by such adjustment comprising housing means operatively connected with one of the two torsion rod portions for rotation in unison therewith, vane-type piston means within said housing means forming effectively adjusting chamber means and operatively connected for rotation in unison with the other of the torsion rod portions, substantially radially disposed locking pin means within said housing means and subjected, on the one hand, to the adjustable force of spring means and, on the other, to the working pressure of said pressure medium prevailing within the adjusting chamber means effectively formed between said vane-type piston means and said housing means, said piston means including a bearing head portion provided within the area of said locking pin means with two partial circumferential slots, said locking pin means engaging in a locking manner into the slots provided in said piston means to lockingly abut against the ends of said slots and being displaced into the unlocking position thereof by said working pressure in opposition to said spring force, said housing means including an end wall in which said pin means are movably arranged, first means within said piston means effectively providing a communication between the chamber means of said motor and the end faces of said pin means operable to produce an unlocking effect on a respective pin means by the working pressure of said pressure medium, and second means in said end wall to effectively provide a communication between said chamber means and respective spring spaces accommodating said spring means operable to produce a locking pressure on the corresponding pin means.

8. In a motor vehicle provided with an anti-tilt, two-partite torsion rod stabilizer spring system operatively connecting oppositely disposed wheel suspension means of the vehicle, the improvement essentially consisting of an adjusting motor actuated by a pressure medium and operatively connecting in an adjustable manner the two parts of the torsion rod to obtain an anti-tilt effect by such adjustment comprising housing means operatively connected with one of the two torsion rod portions for rotation in unison therewith, vane-type piston means within said housing means forming effectively adjusting chamber means and operatively connected for rotation in unison with the other of the torsion rod portions, substantially radially disposed locking pin means within said housing means and subjected, on the one hand, to the adjustable force of spring means and, on the other, to the working pressure of said pressure medium prevailing within the adjusting chamber means effectively formed between said vane-type piston means and said housing means, said piston means including a bearing head portion provided within the area of said locking pin means with two partial circumferential slots, said locking pin means engaging in a locking manner into the slots provided in said piston means to lockingly abut against the ends of said slots and being displaced into the unlocking position thereof by said working pressure in opposition to said spring force.

9. In a motor vehicle provided with an anti-tilt two-partite torsion rod stabilizer spring system operatively connecting oppositely disposed wheel suspension means of the vehicle, the improvement essentially consisting of an adjusting motor actuated by a pressure medium and operatively connecting in an adjustable manner the two parts of the torsion rod to obtain an anti-tilt effect by such adjustment comprising housing means operatively connected with one of the two torsion rod portions for rotation in unison therewith, swinging piston means within said housing means and operatively connected for rotation in unison with the other of the torsion rod portions, locking pin means disposed within said housing means and subjected, on the one hand, to the adjustable force of spring means and, on the other, to the working pressure of said pressure medium prevailing within the adjusting chamber effectively formed between said swinging piston means and said housing means, said locking pin means being adapted to be displaced into the unlocking position thereof by said working pressure in opposition to said spring force, said housing means including an end wall in which said pin means are movably arranged, first means operable to effect unlocking of a respective pin means by the working pressure of said pressure medium, and second means to effectively provide a communication between the working chambers and respective spring spaces accommodating said spring means to produce a locking pressure on the corresponding pin means.

10. An anti-tilt system for stabilizing the vehicle body of a motor vehicle having oppositely disposed front and rear wheels while driving through curves, comprising wheel suspension means for oppositely disposed wheels thereof, stabilizer torsion rod means operatively connecting with each other oppositely disposed wheel suspension means, said stabilizer torsion rod means including two angularly bent torsion rod portions pivotally secured to the vehicle body and with the inwardly disposed ends thereof arranged substantially coaxially opposite each other, and means including pressure-medium-actuated adjusting motor means between said two torsion rod portions operatively connecting said two torsion rod portions for adjustment thereof with respect to each other in opposition to the effect of the centrifugal force acting on the vehicle, said torsion rod pivoting about an axis extending essentially transversely of the vehicle, said adjusting motor means including cylinder housing means operatively connected with one of said inwardly disposed torsion rod ends, swinging piston means within said cylinder housing means operatively connected with the other of said torsion rod ends, said cylinder housing and piston means being disposed substantially concentrically to each other and being provided with radial web portions subdividing the cylinder space into a plurality of working chambers adapted to be selectively filled with the pressure medium to thereby selectively displace said swinging piston means, and locking means associated with said adjusting motor means for locking the same in dependence on the pressure medium of said adjusting motor means, said locking means including substantially radially disposed locking pin means within said housing means and subjected, on the one hand, to the adjustable force of spring means and, on the other, to the working pressure of the pressure medium prevailing within the working chambers, said locking pin means engaging in a locking manner into corresponding slots of said piston means and being displaced into the unlocking position thereof by said working pressure in opposition to said spring force, said housing means including an end wall in which said pin means are movably arranged, first bore means within said piston means to effectively provide a communication between the working chambers of said motor and the end face of said pin means to effect unlocking of a respective pin means by the working pressure of said pressure medium, and second bore means in said end wall to effectively provide a communication between said working chambers and respective spring spaces accommodating said spring means to produce a locking pressure on the corresponding pin means.

11. In a motor vehicle provided with an anti-tilt, two-partite torsion rod stabilizer spring system operatively connecting oppositely disposed wheel suspension means of the vehicle, the improvement essentially consisting of an adjusting motor actuated by a pressure medium and operatively connecting in an adjustable manner the two parts of the torsion rod to obtain an anti-tilt effert by such adjustment comprising locking means within said adjusting motor to effectively lock the same in the absence of sufficient pressure medium, said adjusting motor having rotatable cylindrical casing means connected to one of said two parts of said torsion rod and rotatable rib means extending radially inwardly of said cylinder means, rotatable swinging piston means connected to the other of said two parts and having vane means extending outwardly radially thereof, said locking means comprising co-operating means carried by said cylinder means and said swinging piston means.

12. In a motor vehicle provided with an anti-tilt, two-partite torsion rod stabilizer spring system operatively connecting oppositely disposed wheel suspension means of the vehicle, the improvement essentially consisting of an adjusting motor actuated by a pressure medium and operatively connecting in an adjustable manner the two parts of the torsion rod to obtain an anti-tilt effect by such adjustment comprising locking means within said adjusting motor to effectively lock the same in the absence of sufficient pressure medium, said locking means including a plurality of locking members, first means selectively effecting an unlocking action on at least one of said locking members by said pressure medium, and second means selectively effecting a locking action on at least another one of said locking members by said pressure medium.

References Cited by the Examiner
UNITED STATES PATENTS

| 1,929,791 | 10/33 | Peo | 188—87 |
| 2,387,249 | 10/45 | Eddington | 280—124 |
| 2,757,938 | 8/56 | Crowder | 280—112 |

A. HARRY LEVY, *Primary Examiner.*

PHILIP ARNOLD, *Examiner.*